(12) United States Patent
Lee et al.

(10) Patent No.: US 12,316,482 B2
(45) Date of Patent: *May 27, 2025

(54) HIGH-SPEED SIGNALING SYSTEMS AND METHODS WITH ADAPTABLE, CONTINUOUS-TIME EQUALIZATION

(71) Applicant: Rambus Inc., San Jose, CA (US)

(72) Inventors: Hae-Chang Lee, Los Altos, CA (US); Brian S. Leibowitz, San Francisco, CA (US); Jade M. Kizer, Fort Collins, CO (US); Thomas H. Greer, Chapel Hill, NC (US); Akash Bansal, Santa Clara, CA (US)

(73) Assignee: Rambus Inc., San Jose, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/931,125

(22) Filed: Sep. 11, 2022

(65) Prior Publication Data

US 2023/0082649 A1 Mar. 16, 2023

Related U.S. Application Data

(63) Continuation of application No. 17/110,530, filed on Dec. 3, 2020, now Pat. No. 11,469,927, which is a
(Continued)

(51) Int. Cl.
*H04L 25/03* (2006.01)
*H04B 1/12* (2006.01)

(52) U.S. Cl.
CPC ....... *H04L 25/03159* (2013.01); *H04B 1/123* (2013.01); *H04L 25/03057* (2013.01);
(Continued)

(58) Field of Classification Search
CPC ......... H04L 25/03159; H04L 25/03057; H04L 25/0307; H04L 25/03885;
(Continued)

(56) References Cited

U.S. PATENT DOCUMENTS

| 4,187,479 A | 2/1980 | Ishizuka et al. |
| 4,459,698 A | 7/1984 | Yumoto et al. |

(Continued)

FOREIGN PATENT DOCUMENTS

| EP | 0467412 | 1/1992 |
| WO | WO-2005-022750 | 3/2005 |
| WO | WO-2005-071848 A1 | 8/2005 |

OTHER PUBLICATIONS

Baker, Alan J, "An Adaptive Cable Equalizer for Serial Digital Video Rates to 400Mb/s." 1996 IEEE International Solid-State Circuits Conference, Session 10, Low-Power & Communication Signal Processing, Paper FA 10.7. 3 Pages.

(Continued)

*Primary Examiner* — Syed Haider
(74) *Attorney, Agent, or Firm* — Silicon Edge Law Group LLP; Arthur J. Behiel

(57) ABSTRACT

A receiver includes a continuous-time equalizer, a decision-feedback equalizer (DFE), data and error sampling logic, and an adaptation engine. The receiver corrects for inter-symbol interference (ISI) associated with the most recent data symbol (first post cursor ISI) by establishing appropriate equalization settings for the continuous-time equalizer based upon a measure of the first-post-cursor ISI.

20 Claims, 5 Drawing Sheets

Related U.S. Application Data continuation of application No. 16/750,924, filed on Jan. 23, 2020, now Pat. No. 10,938,605, which is a continuation of application No. 16/182,735, filed on Nov. 7, 2018, now Pat. No. 10,560,291, which is a continuation of application No. 15/827,777, filed on Nov. 30, 2017, now Pat. No. 10,135,646, which is a continuation of application No. 15/208,332, filed on Jul. 12, 2016, now Pat. No. 9,860,089, which is a continuation of application No. 14/552,598, filed on Nov. 25, 2014, now Pat. No. 9,419,663, which is a continuation of application No. 12/522,362, filed as application No. PCT/US2008/000249 on Jan. 7, 2008, now Pat. No. 8,934,525.

(60) Provisional application No. 60/879,461, filed on Jan. 8, 2007.

(52) U.S. Cl.
CPC .... *H04L 25/0307* (2013.01); *H04L 25/03885* (2013.01); *H04L 2025/03356* (2013.01); *H04L 2025/03636* (2013.01)

(58) Field of Classification Search
CPC ........... H04L 2025/03356; H04L 2025/03636; H04B 1/123
See application file for complete search history.

(56) References Cited

U.S. PATENT DOCUMENTS

| | | | |
|---|---|---|---|
| 4,639,681 A | 1/1987 | Hasegawa | |
| 4,750,155 A | 6/1988 | Hsieh | |
| 4,985,900 A | 1/1991 | Rhind et al. | |
| 5,293,405 A | 3/1994 | Gersbach et al. | |
| 5,481,564 A | 1/1996 | Kakuishi et al. | |
| 5,682,112 A | 10/1997 | Fukushima | |
| 5,764,695 A | 6/1998 | Nagaraj et al. | |
| 5,844,431 A | 12/1998 | Chen | |
| 5,991,339 A | 11/1999 | Bazes et al. | |
| 5,999,056 A | 12/1999 | Fong | |
| 6,192,071 B1 | 2/2001 | Hirth et al. | |
| 6,225,795 B1 | 5/2001 | Stratakos et al. | |
| 6,265,911 B1 | 7/2001 | Nairn | |
| 6,266,379 B1 | 7/2001 | Dally | |
| 6,329,874 B1 | 12/2001 | Ye et al. | |
| 6,429,692 B1 | 8/2002 | Chan et al. | |
| 6,496,911 B1 | 12/2002 | Dixon et al. | |
| 6,570,916 B1 | 5/2003 | Feldbaumer et al. | |
| 6,624,688 B2 | 9/2003 | Jaussi et al. | |
| 6,731,683 B1 | 5/2004 | Fiedler et al. | |
| 6,812,872 B1 | 11/2004 | Lu | |
| 6,819,166 B1 | 11/2004 | Choi et al. | |
| 6,954,495 B2 | 10/2005 | Piirainen | |
| 6,992,855 B2 | 1/2006 | Ehrlich | |
| 7,016,406 B1 | 3/2006 | Phanse et al. | |
| 7,027,503 B2 | 4/2006 | Smee et al. | |
| 7,030,657 B2 | 4/2006 | Stojanovic et al. | |
| 7,092,472 B2 | 8/2006 | Stojanovic | |
| 7,126,378 B2 | 10/2006 | Stojanovic et al. | |
| 7,176,721 B2 | 2/2007 | Ho et al. | |
| 7,177,352 B1 | 2/2007 | Plasterer et al. | |
| 7,233,164 B2 | 6/2007 | Stojanovic et al. | |
| 7,286,597 B2 | 10/2007 | Buchwald et al. | |
| 7,339,989 B1 | 3/2008 | McAdam et al. | |
| 7,397,848 B2 | 7/2008 | Stojanovic et al. | |
| 7,400,675 B2 | 7/2008 | Moughabghab et al. | |
| 7,424,053 B2 | 9/2008 | Murray et al. | |
| 7,496,161 B2 | 2/2009 | Chou et al. | |
| 7,715,471 B2 | 5/2010 | Werner et al. | |
| 7,782,935 B1 | 8/2010 | Wong et al. | |
| 8,446,940 B2 | 5/2013 | Farjad-rad | |
| 2002/0009167 A1 | 1/2002 | Farjad-Rad | |
| 2003/0058962 A1 | 3/2003 | Baldwin | |
| 2004/0005001 A1 | 1/2004 | Jones et al. | |
| 2004/0008059 A1 | 1/2004 | Chen et al. | |
| 2004/0032813 A1 | 2/2004 | Lee et al. | |
| 2004/0047409 A1* | 3/2004 | Lee ................ H03H 21/0043 375/232 |
| 2004/0052309 A1 | 3/2004 | Li | |
| 2004/0091028 A1 | 5/2004 | Aronson et al. | |
| 2004/0136731 A1 | 7/2004 | Wang et al. | |
| 2004/0153898 A1 | 8/2004 | Hidaka | |
| 2004/0190661 A1 | 9/2004 | Vrazel | |
| 2005/0047500 A1 | 3/2005 | Gupta et al. | |
| 2005/0058234 A1 | 3/2005 | Stojanovic | |
| 2005/0175080 A1 | 8/2005 | Bouillett | |
| 2005/0195894 A1 | 9/2005 | Kim et al. | |
| 2005/0259726 A1 | 11/2005 | Farjad-rad | |
| 2005/0271169 A1* | 12/2005 | Momtaz ................ H04L 7/033 375/345 |
| 2006/0082406 A1 | 4/2006 | Mukherjee et al. | |
| 2006/0159200 A1 | 7/2006 | Hsu et al. | |
| 2006/0188043 A1* | 8/2006 | Zerbe ................ H04L 27/01 375/233 |
| 2007/0047636 A1 | 3/2007 | Lim et al. | |
| 2007/0110199 A1 | 5/2007 | Momtaz et al. | |
| 2007/0110296 A1 | 5/2007 | Alattar | |
| 2007/0258517 A1* | 11/2007 | Rollings ........... H04L 25/03057 375/233 |
| 2007/0280341 A1 | 12/2007 | Hidaka | |
| 2008/0069191 A1 | 3/2008 | Dong et al. | |
| 2008/0107165 A1 | 5/2008 | Nicolescu et al. | |
| 2008/0247452 A1 | 10/2008 | Lee | |
| 2008/0260016 A1 | 10/2008 | Lapointe et al. | |
| 2008/0279271 A1 | 11/2008 | Hauviller et al. | |
| 2010/0027606 A1 | 2/2010 | Dai et al. | |

OTHER PUBLICATIONS

Chen et al., "A 1.25Gb/s, 460mW CMOS Transceiver for Serial Data Communication," ISSCC97, Session 15, Serial Data Communications, Paper FP 15.3, pp. 242-243, 465, Feb. 7, 1997. 3 pages.
Chng et al., "Determining the Optimal Decision Delay Parameter for a Linear Equalizer," Revised Sep. 2, 2004, pp. 20-24. 5 pages.
Choi, Jong-Sang, et al. "A CMOS 3.5Gbps Continuous-time Adaptive Cable Equalizer with Joint Adaptation Method of Low-Frequency Gain and High-Frequency Boosting." 2003 Symposium on VLSI Circuits Digest of Technical Paper. 4 Pages.
CN First Office Action dated Jul. 2, 2012 in CN Application No. 200880001824.3. 16 pages.
Dally et al., "Transmitter Equalization for 4-Gbps Signaling," IEEE Micro, vol. 17, No. 1, Jan./Feb. 1997, pp. 48-56. 9 pages.
Der, Lawrence, "A 2GHz CMOS Image-Reject Receiver with Sign-Sign LMS Calibration," 2001 IEEE International Solid-State Circuits Conference. 3 pages.
EP Office Action dated Aug. 1, 2013, re Application No. 08705518.2 filed Jan. 7, 2008. 6 pages.
EP Office Action with mail date of Jun. 16, 2010 re EP Application No. 08705518.2. 7 pages.
EP Official Communication dated Aug. 8, 2013 in EP Application No. 12170931.5. 10 pages.
EP Response dated Aug. 8, 2012 in EP Application No. 12170931.5. 18 pages.
EP Response dated Aug. 8, 2012 in EP Application No. 12170935.6. 17 pages.
EP Response dated Dec. 27, 2010 to the Official Communication dated Jun. 16, 2010 re EP Application No. 08705518.2. 42 pages.
EP Response dated Feb. 11, 2014 re Application No. 08705518.2. 16 Pages.
Farjad-Rad et al., "0.622-8 Gbps 150mW Serial IO Macrocell with Fully Flexible Preemphasis and Equalization," Symposium on VLSI Circuits Digest of Technical Papers, Jun. 2003. 4 pages.
Granberg, Tom, "Handbook of Digital Techniques for High-Speed Design." Prentice Hall Modern Semiconductor Design Series. Copyright 2004 by Pearson Education, Inc. 12 pages.

(56) References Cited

OTHER PUBLICATIONS

International Preliminary Report on Patentability for PCT/US2008/000249 mailed Mar. 3, 2009 from the EPO. 9 pages.
Jun, Byung-Eul et al. "Convergence Analysis of Sign-Sign LMS Algorithm for Adaptive Filters with Correlated Gaussian Data", ICASSP-95: 1995 International Conference on Acoustics, Speech and Signal Processing, vol. 2, May 9, 1995 (May 9, 1995), -May 12, 1995 (Apr. 12, 1995) pp. 1380-1383, XP010151570 New York, NY, USA section 2 up to p. 1381. 4 pages.
Kudoh, Yoshiharu. "A 0.13—um CMOS 5-GB/s 10-m 28 AWG Cable Transceiver with No-Feedback-Loop Continuous-Time Post-Equalizer." IEEE Journal of Solid-State Circuits, vol. 38., No. 5, May 2003. 6 Pages.
Lin et al., "Optimum Diversity Combining with Finite-Tap Decision Feedback Equalization in Digital Cellular Mobile Radio", 1997 IEEE International Conference on communications, Held in Montreal, Jun. 8, 1997 (Jun. 8, 1997), -Jun. 12, 1997 (Jun. 12, 1997) pp. 629-635, XP000742019 New York, NY, USA ISBN: 978-0-7803-3926-2 sections III.A and III.B.
Madduri, Vansanta, "High Speed Backplanes in Communications Systems." Mar. 2004. 7 pages.
Shakiba, Mohammad Hossein, "A 2.5Gb/s Adaptive Cable Equalizer." 1999 IEEE International Solid-State Circuits Conference, Session 23, Paper WP 23.3. 2 PageS.
Spalvieri, Arnaldo, "Linear Equalization of Linearly Modulated Signals," Milano, Mar. 2006. 27 pages.
Stephens, Ransom, "Equalizaton: The Correction and Analysis of Degraded Signal," Agilent Technologies, dated Sep. 15, 2005. 12 pages.
Stojanovic et al., "Adaptive Equalization and Data Recovery in a Dual-Mode (PAM2/4) Serial Link Transceiver," Rambus, Inc. Department of Electrical Engineering, Stanford University, Jan. 2004. 4 pages.
Stojanovic, Vladimir et al. "Transmit Pre-Emphasis for High-Speed Time-Division-Multiplexed Serial Link Transceiver." Submitted to IEEE Symposium on VLSI Circuits, Jun. 2004. 17 pages.
Widmer et al., "Single-Chip 4 × 500-MBd CMOS Transceiver," IEEE Journal of Solid-State Circuits, vol. 31, No. 12, Dec. 1996, pp. 2004-2014. 11 pages.
Wong et al., "A 50 MHz Eight-Tap Adaptive Equalizer for Partial-Response Channels," dated Mar. 3, 1995, IEEE journal of Solid-State Circuits, vol. 30, No. 3, p. 228-234. 7 pages.
Zerbe et al., "Comparison of Adaptive and Non-Adaptive Equalization Methods in High-Performance Backplanes," dated 2005, DegignCon 2005. 17 pages.
Zerbe, et al., "Equalization and Clock Recovery for a 2.5—10 GB/s 2-PAM/4-PAM Backplane Transceiver Cell", Presented at ISSCC 2003, Session 4, Clock Recovery and Backplane Transceivers, Paper 4.6. 10 pages.
Zhang, Johnny et al. "White Paper on Transmit Pre-Emphasis and Receive Equalization." Oct. 31, 2002. 8 pages.

\* cited by examiner

HIGH-SPEED SIGNALING SYSTEMS AND METHODS WITH ADAPTABLE, CONTINUOUS-TIME EQUALIZATION

FIELD OF THE INVENTION

The present invention relates generally to the field of communications, and more particularly to high speed electronic signaling within and between integrated circuit devices.

BACKGROUND

The performance of many digital systems is limited by the interconnection bandwidth within and between integrated circuit devices (ICs). High performance communication channels between ICs suffer from many effects that degrade signals. Primary among them is inter-symbol interference (ISI) from high frequency signal attenuation and reflections due to impedance discontinuities.

ISI becomes more pronounced at higher signaling rates, ultimately degrading signal quality to the point at which distinctions between originally transmitted signal levels may be lost. Some receivers cancel ISI using a decision-feedback equalizer (DFE). DFEs multiply each of N recently received symbols by respective tap coefficients, the resulting products representing the ISI attributable to the corresponding symbol. The sum of these products is subtracted from the received signal prior to sampling. The ISI associated with the prior data is thereby reduced or eliminated.

In very high-speed systems it can be difficult to resolve the most recent data bit or bits in time to calculate their impact on the incoming symbol. Some receivers therefore ignore the impact of such symbols on the incoming signal, and consequently fail to correct for the ISI attributed to those symbols. Other receivers employ partial response DFEs (PrDFEs) that obtain multiple samples of the incoming data using multiple correction coefficients, one for each of the possible values of the most recently received symbol or symbols. The correct sample is then selected after the most recently received symbol or symbols are resolved.

PrDFEs are effective, but require a separate subtraction and sampling path for each possible value of the most recently received symbol or, in the case of multiple symbols (multi-symbol PrDFE), a separate computational path for each possible combination of the multiple symbol values. This results in e.g. $2^M$ paths in a binary PrDFE system that considers M prior symbols. The additional paths occupy area, require power, and slow signal rates by increasing the input capacitance of the receiver. There is therefore a need for power and area-efficient receivers capable of filtering incoming signals to cancel ISI from the most recently received symbol or symbols.

DETAILED DESCRIPTION

Figure 1:
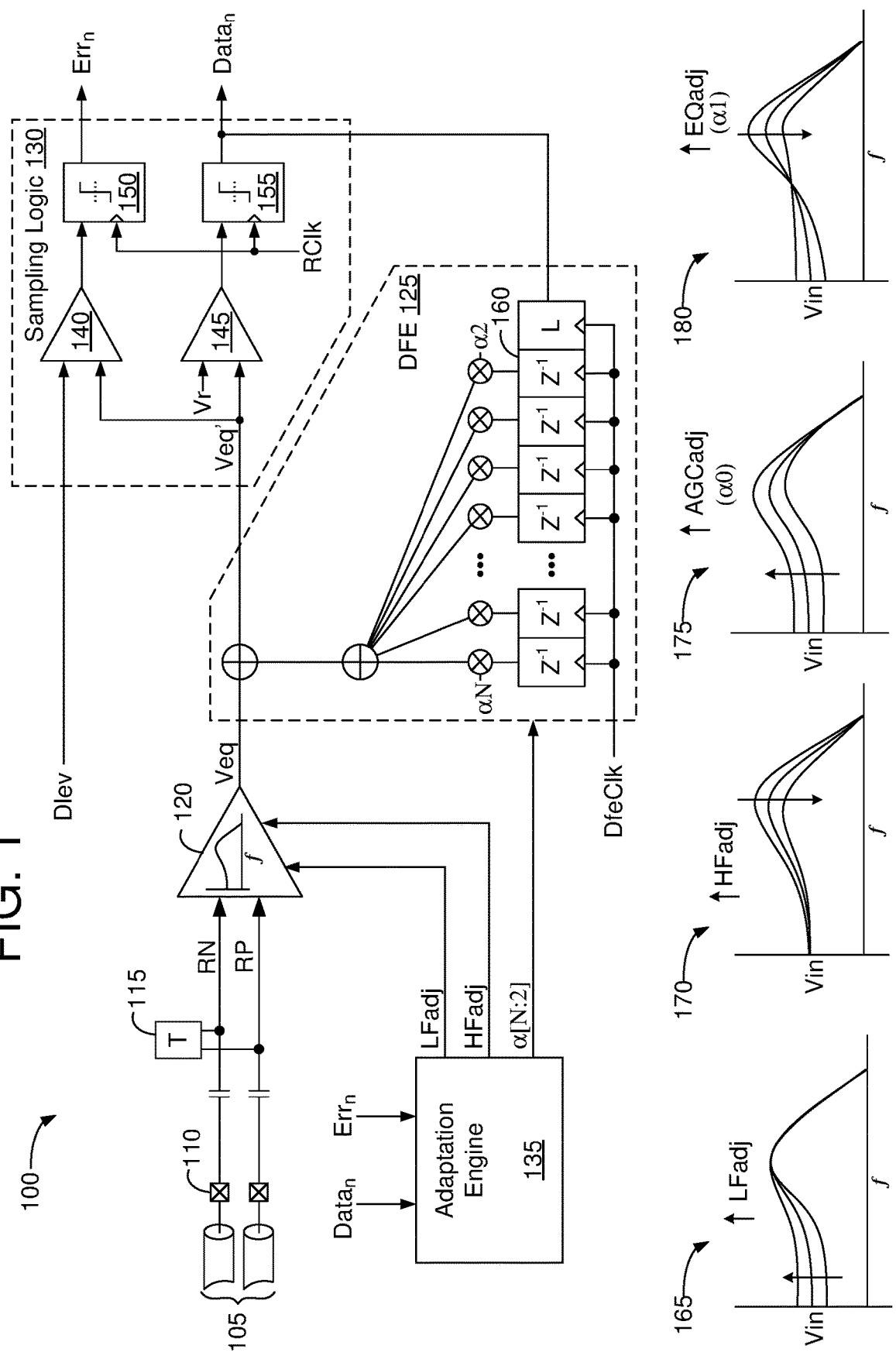
FIG. 1 depicts a receiver 100, in accordance with one embodiment, that receives information from a transmitter (not shown) via a high-speed communication channel 105.

FIG. 1 depicts a receiver 100, in accordance with one embodiment, that receives information from a transmitter (not shown) via a high-speed communication channel 105. In one embodiment, receiver 100 is instantiated on an integrated-circuit (IC) device and channel 105 provides differential signals RN and RP to a like-named differential input port of receiver 100 via a pair of pads 110. Channel 105 is AC coupled and includes a termination element 115 in this example. In other embodiments channel 105 is e.g. DC coupled, single ended, or optical. In embodiments adapted to communicate over optical channels, receiver 100 may include an integrated optical-to-electrical converter. Receiver 100 includes an analog, continuous-time equalizer 120, a decision-feedback equalizer (DFE) 125, data and error sampling logic 130, and an equalization-adaptation engine 135.

Equalizer 120 equalizes differential data signal RP/RN, conveyed from channel 105 to an input port of equalizer 120, to produce an equalized signal Veq on a like-named output port. (As with other designations herein, Veq refers both to a signal and a corresponding node or port; whether a given designation refers to a signal or a circuit element will be clear from the context.) Receiver 100 corrects for inter-symbol interference (ISI) associated with the most recent data symbol (first post cursor ISI) by establishing appropriate equalization settings for continuous-time equalizer 120 based upon a measure of the first-post-cursor ISI. In doing so, receiver 100 can eliminate the need to resolve the most recent data bit in time to calculate its impact on the incoming signal, and thus facilitate communication at higher speeds without the attendant complexity and power required by PrDFE-based receivers. Some embodiments may use PrDFE for subsequent filter taps or to complement the continuous-time equalizer.

Equalizer 120 amplifies signal RP/RN using a range of amplification factors, with higher frequency components typically being treated to higher amplification factors. Channel 105 will typically exhibit a low pass filter effect, in which case equalizer 120 may be used to compensate for attenuation of higher-frequency signal components. In some embodiments, the low-frequency gain of equalizer 120 may also be adjusted to compensate for broadband signal attenuation. Gain adjustments can be accomplished by frequency-selective amplification or attenuation, or a combination of amplification and attenuation. In general, the goal of equalization is to reduce or minimize the effects of ISI, so equalization is typically accomplished by adjusting one or more characteristics of a signal in a manner that mitigates the effects of ISI.

DFE 125 further equalizes signal Veq to produce a second equalized signal Veq' for sampling logic 130. DFE 125 stores sequences of sampled data in a buffer 160 as post-tap data values. Though not shown, tap select logic may be included to enable selection of a subset of data values within buffer 160. Receive-side equalization taps can thus be selected to have latencies that match whatever ISI components are evident in channel 105. Each stored data value in buffer 160 after the initial latch is multiplied by a corresponding tap coefficient. The resulting products are summed and the total added to equalized signal Veq to produce the second equalized signal Veq'. In one embodiment clock signal DfeClk to DFE 125 is a recovered clock signal synchronized to the edges of the equalized signal as observed at the input of sampler 155. The DfeClk is phase offset from (e.g. the complement of) receive clock RClk. The error sampler can be timed to the edges of the equalized signal in other embodiments, as by tying the clock terminal of sampler 150 to an edge clock signal (not shown).

Amplifier 140 within sampling logic 130 compares signal Veq' with a selected data level Dlev, outputting a signal indicative of a logic one (zero) if Veq' is greater than (less than) level Dlev. Sampler 150 periodically captures the output from amplifier 140 on rising edges of a receive clock signal RClk to produce a series of error samples $Err_n$. A second amplifier 145 compares signal Veq' with a reference voltage Vr (e.g., zero volts), outputting a signal indicative of a logic one (zero) if Veq' is greater than (less than) level Vr. Sampler 155 periodically captures the output from amplifier 145 on rising edges of receive clock signal RClk to produce a series of data samples $Data_n$.

Adaptation engine 135 employs data and error samples $Data_n$ and $Err_n$ from sampling logic 130 to generate the tap values for equalizer 120 and DFE 125. In an embodiment in which equalizer 120 is adapted to provide both automatic gain control (AGC) to compensate for broadband gain and equalization to compensate for ISI, adaptation engine 135 generates measures of DC attenuation and one or more ISI values by comparing error signals $Err_n$ with data samples of various symbol latencies. Based upon these generated values, adaptation engine 135 issues low-frequency control signals LFadj and high-frequency control signals HFadj to a control port of equalizer 120, and thereby controls the low-frequency gain and the peaking response of equalizer 120. In other embodiments a single control signal can control multiple equalization parameters, including e.g. the low-frequency gain and the peaking response, Four simplified frequency-response diagrams 165, 170, 175, and 180 in the lower portion of FIG. 1 depict the approximate effects of adjusting the low-frequency and high-frequency gain of equalizer 120 in one embodiment. As shown in diagram 165, increasing the value of signal LFadj tends to increase the gain of equalizer 120 at low frequencies. With reference to diagram 170, increasing the value of signal HFadj tends to decrease the peak response of equalizer 120 around a particular (high) frequency of interest. Diagram 175 shows how the broadband frequency response of equalizer 120 is adjusted by moving signals LFadj and HFadj together in opposite directions. Diagram 180 shows how the equalization frequency response of equalizer 120 is adjusted by moving signals LFadj and HFadj together in the same direction. Equalizer 120 can equalize incoming signals by attenuating or amplifying some frequency components more than others, or by a combination of amplification and attenuation.

The LFadj signal from adaptation engine 135 adjusts the low-frequency gain of equalizer 120. The HFadj signal from adaptation engine 135, adjusts the peaking response of equalizer 120. Signals LFadj and HFadj are combinations of the $\alpha[1:0]$ signals that indicate the broadband gain (AGCadj) and equalization emphasis (EQadj) desired. The remaining adjustment signals $\alpha[N:2]$ are measures of the remaining ISI attributes due to the prior data symbols stored within buffer 160.

Figure 2:
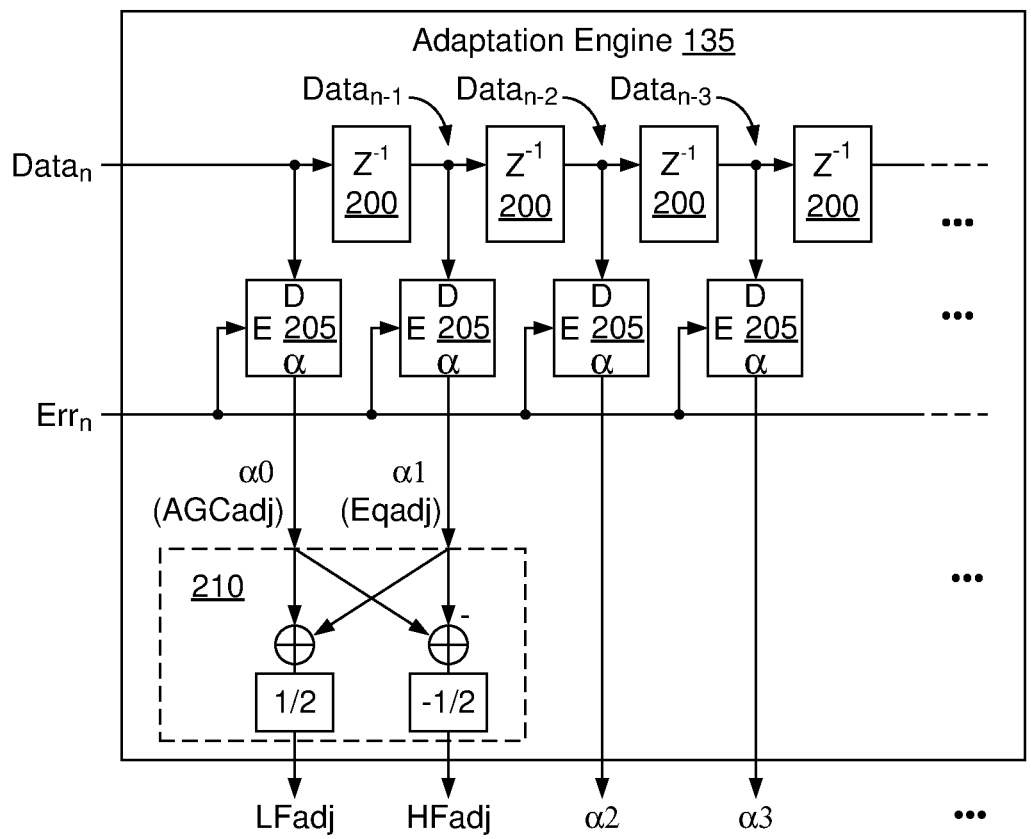
FIG. 2 depicts adaptation engine 135 in accordance with one embodiment.

FIG. 2 depicts adaptation engine 135 in accordance with one embodiment. Adaptation engine 135 includes a series of synchronous storage elements 200 and tap-value generators 205 that together generate, from data and error samples $Data_n$ and $Err_n$, tap values $\alpha[1:0]$ for equalizer 120 and $\alpha[N:2]$ for DFE 125. The data and error samples are received on respective input ports, while the $\alpha$ values are conveyed to equalizer 120 and DFE 125 via the corresponding adaptation-engine output ports. Tap-value generators 205 each compare incoming error signals $Err_n$ with either a current data sample $Data_n$ or one of N−1 prior data samples to compute tap values $\alpha[N:0]$. Element 210 shows the arithmetic logic utilized to generate LFadj and HFadj signals from AGCadj and EQadj ($\alpha[1:0]$). Increasing the value of signal HFadj decreases the peaking response of equalizer 120 in this embodiment.

Figure 3:
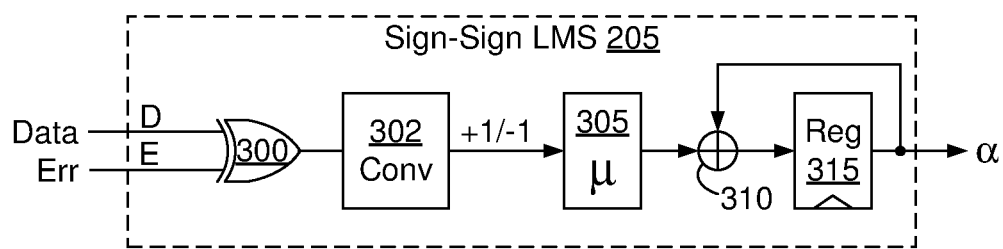
FIG. 3 details an embodiment of a tap-value generator 205 of FIG. 2 that generates a tap value using a sign-sign, least-mean-squared (LMS) algorithm.

FIG. 3 details an embodiment of a tap-value generator 205 of FIG. 2 that generates a tap value using a sign-sign, least-mean-squared (LMS) algorithm. Generator 205 includes an XOR gate 300, logic 302 to convert the unsigned XOR output to a signed number, a multiplier 305 to scale the signed number by a constant an adder 310, and a register 315. XOR gate 300 compares the corresponding data and error samples and presents its output to multiplier 305 via converter 302. The data and error samples represent the signs of the sampled values, so XOR gate 300 and converter 302 collectively have the effect of multiplying the signs and presenting the result to multiplier 305. Multiplier 305 multiplies the resulting product by a selected gain step size μ for the filter tap. Adder 310 adds the output from multiplier 305 to the current contents of register 315, which is then updated with the new count. Register 315 thus accumulates a count representative of the $\alpha$ value for the filter tap associated with the data samples of a particular latency. The $\alpha$ value for the filter tap is, in turn, representative of the ISI contribution of that filter tap to the present symbol. Ideally, each $\alpha$ value exactly offsets the respective ISI contribution. Perfection is difficult to obtain in practice, however, and the optimal tap values tend to vary with e.g. temperature and supply-voltage. Tap value generator 205 thus adaptively maintains representative $\alpha$ values that approximate the respective ISI contributions.

Figure 4A:
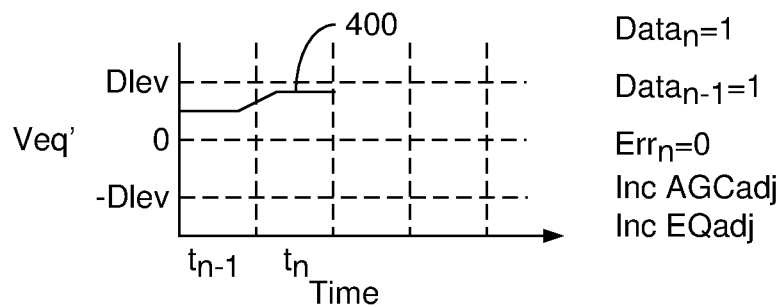
FIGS. 4A-4D are waveform diagrams illustrating how tap-value generator 205 generates the values for taps $\alpha_0$ (AGCadj) and $\alpha_1$ (EQadj) in accordance with one embodiment.
Figure 4B:
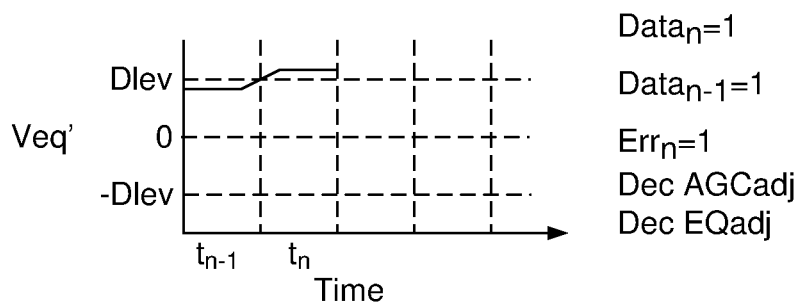
Figure 4C:
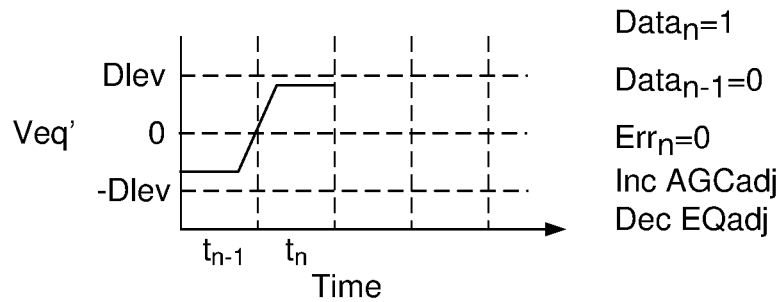
Figure 4D:
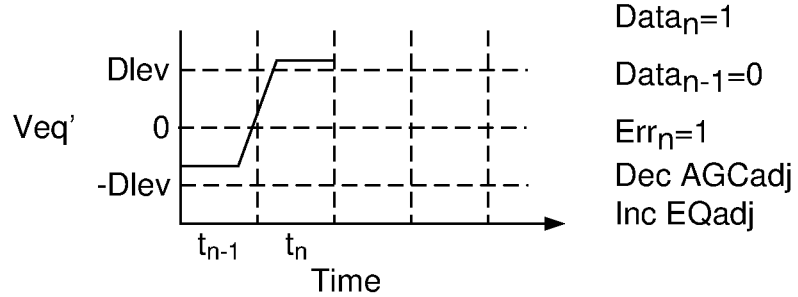

FIGS. 4A-4D are waveform diagrams illustrating how tap-value generator 205 generates the values for taps $\alpha_0$ (AGCadj) and $\alpha_1$ (EQadj) in accordance with one embodiment. Turning first to FIG. 4A, a signal trace 400 represents an incoming analog signal Veq' over two symbol times $t_{n-1}$ (the window for prior data $Data_{n-1}$) and $t_n$ (the window for current data $Data_n$), in a case where signal conveys a data value of 1 at each symbol time. In this embodiment, Vr is equal to zero. Broadband gain adjustments are based upon the current sampled data value $Data_n$ and the current sampled error value $Err_n$. The sampled error is not shown; however, it can be seen that error sample $Err_n$ for FIG. 4A would be zero because the value of trace 400 is less than Dlev in the time interval for $t_n$. In that case, the AGCadj is incremented to increase the broadband gain of equalizer 120. The same holds true for the example of FIG. 4C. In FIGS. 4B and 4D, however, the current value of Veq' is greater than Dlev, indicating that the sign of $Err_n$ is one, in which case tap value AGCadj is decremented to reduce the broadband gain.

Returning to FIG. 4A, adjustments to EQadj are based upon the prior sampled data value $D_{n-1}$ and the current sampled error value $Err_n$. As noted previously, error sample $Err_n$ for FIG. 4A is zero because the value of trace 400 is less than Dlev in the current time interval. Also evident in FIG. 4A, the value Veq' for the prior sample time $t_{n-1}$ is positive (i.e., $D_{n-1}=1$) because Veq' is greater than reference voltage Vr (e.g., zero volts). In that case, the EQadj is incremented to simultaneously decrease the high-frequency and increase the low-frequency gain of equalizer 120. The high-frequency tap value EQadj is likewise incremented if the current error signal is a one and the prior data signal is a zero, as shown in FIG. 4D. On the other hand, EQadj is decremented, to simultaneously increase the high-frequency and decrease the low-frequency gain, if the current error sample has the same value as the prior data sample, conditions that are represented in FIGS. 4B and 4C.

The forgoing error comparisons are based upon the upper signal level defined by voltage Dlev and applied via amplifier 140. Adaptation engine 135 only updates the tap values α[N:0] based upon measurements that take place when the current data sample $Data_n$ is a logic one. Adaptation engine 135 therefore includes a data filter, not shown, to prevent updates when the current sample $Data_n$ is a logic zero. Other embodiments can include a second amplifier/sampler pair to generate error samples, such as by comparing the incoming signal Veq' with the lower data level—Dlev, or the reference voltage to amplifier 140 can be varied over a number of values or ranges of values to facilitate additional testing and error-correction methods.

Figure 5:
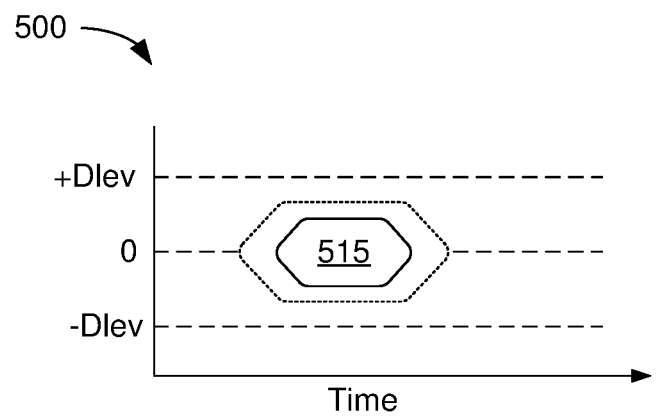
FIG. 5 depicts three eye diagrams 500, 505, and 510 that illustrate the impact on an incoming signal Veq' of adjusting signals AGCadj and EQadj.
Figure 5:
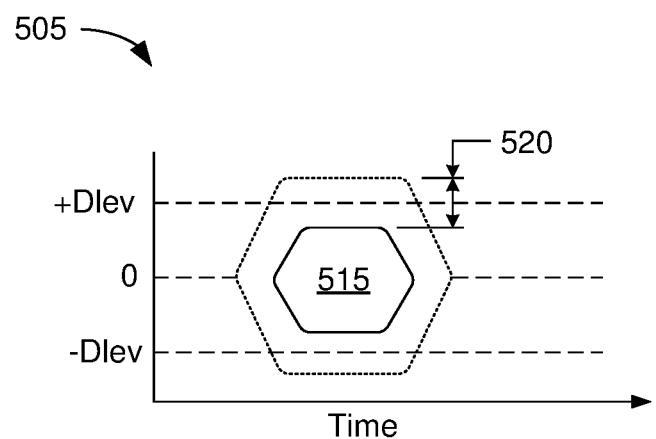
Figure 5:
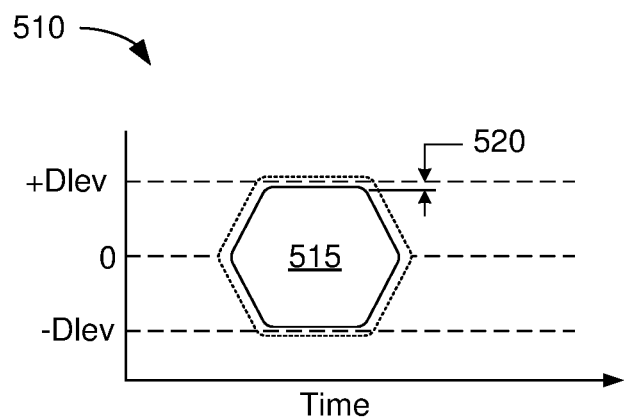

FIG. 5 depicts three eye diagrams 500, 505, and 510 that illustrate the impact on an incoming signal Veq' of adjusting signals AGCadj and EQadj. Beginning with diagram 500, a signal eye 515 is of relatively low amplitude with respect to a desired data level Dlev. In this case, using the method described above in connection with FIGS. 4A-4D, the broadband gain of equalizer 120 may be increased to expand eye 515. With reference to diagram 505, the gain would continue to increase stepwise until eye 515 expanded such that signal level Dlev was in the center of the upper "fuzz" band 520. At the center of the fuzz band, the error sample ($Err_n$) from sampling logic 130 would exhibit an equal likelihood of sampling a one or a zero when the current data $D_n=1$, thus there would be no further net change in AGCadj.

We next consider the impact of adjusting value EQadj. Assuming DFE 125 is doing a reasonable job of cancelling the ISI associated with the post-cursor values for taps two through N, the remaining ISI at Veq' contributing to the width of fuzz band 520 is assumed to be largely a result of first post-cursor ISI. Using the method described above in connection with FIGS. 4A-4D, the equalizer gain of equalizer 120 would be increased or decreased as necessary to reduce the amplitude of fuzz band 520. The adjustment would continue stepwise until eye fuzz band 520 diminished in the manner depicted in diagram 510 of FIG. 5. Thereafter the EQadj, the α1 tap, would experience an equal likelihood of incrementing and decrementing.

Figure 6:
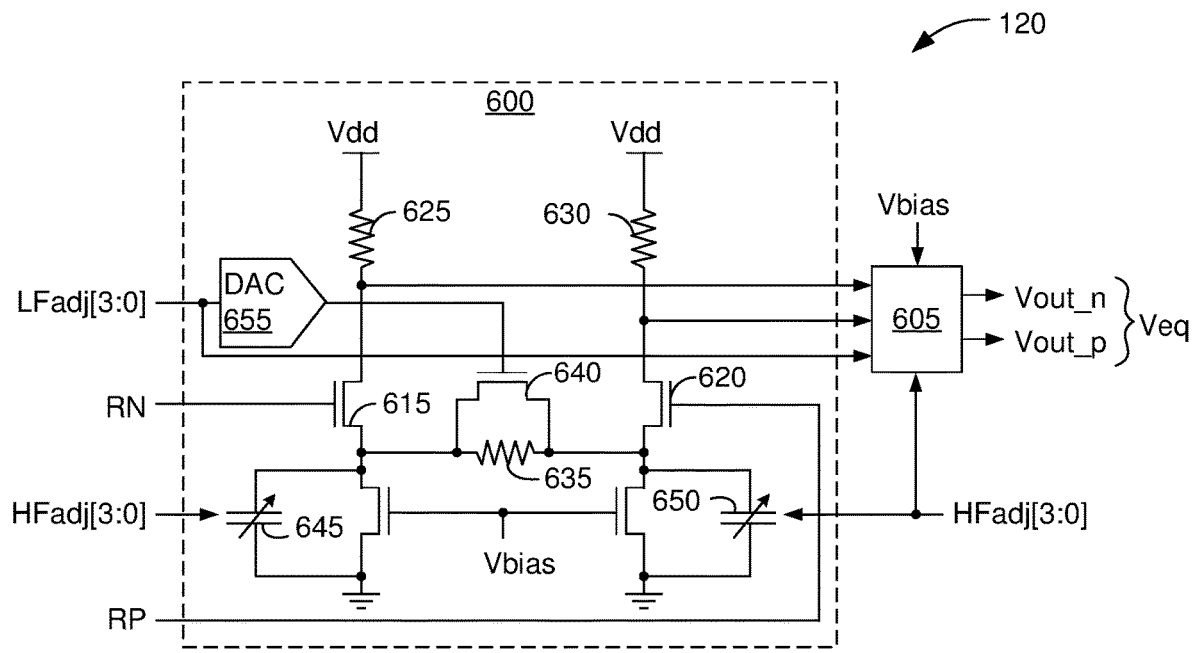
FIG. 6 schematically depicts equalizer 120 of FIG. 1 in accordance with one embodiment.

FIG. 6 schematically depicts equalizer 120 of FIG. 1 in accordance with one embodiment. Equalizer 120 includes two nearly identical stages 600 and 605, the second of which is depicted as a black box for ease of illustration. Other embodiments include more or fewer stages, or other circuit topologies with similar frequency responses. Equalizer stage 600 includes a pair of differential input transistors 615 and 620 with respective loads 625 and 630. Source degeneration is provided by a resistor 635, a transistor 640, and a pair of variable capacitors 645 and 650. The capacitance provided by transistors 645 and 650 is in parallel with resistor 635 and transistor 640 from a differential small-signal perspective, so the net impedance between the sources of transistors 615 and 620 decreases with frequency. As a consequence, the gain of equalizer stage 600 increases with frequency. The resistance through transistor 640 can be adjusted to change the source-degeneration resistance, and thus to alter the low-frequency response of stage 600. The capacitance through capacitors 645 and 650 can be selected to alter the peaking response (high frequency gain) of stage 600.

In an alternative embodiment, source degeneration is provided by one or more metal-insulator-metal (MIM) capacitors connected in parallel with resistor 635. The MIM capacitors can be used instead of or in addition to capacitors 645 and 650. Other control mechanisms might also be used to alter the source-degeneration resistance, as by digitally switching in different sizes and combinations of resistors. In still other embodiments the DC gain adjustment is supported via a separate gain-control amplifier, or is omitted altogether.

A DAC 655 converts the digital equalization setting LFadj[3:0] from e.g. adaptation engine 135 of FIG. 1 to a gate voltage for transistor 640. The value of the equalization setting thus determines the resistance between the sources of transistors 615 and 620, and consequently the low frequency gain of equalizer stage 600. In one embodiment, the output voltage from DAC 655 increases as setting LFadj [3:0] increases from 0000 to 1111. This maximum output represents the lowest resistance between the sources of transistors 615 and 620, and consequently the highest gain setting for stage 600. The output voltage of a similar DAC (not shown) in stage 605 performs a similar function as DAC 655 in stage 600.

Figures 7, 8:
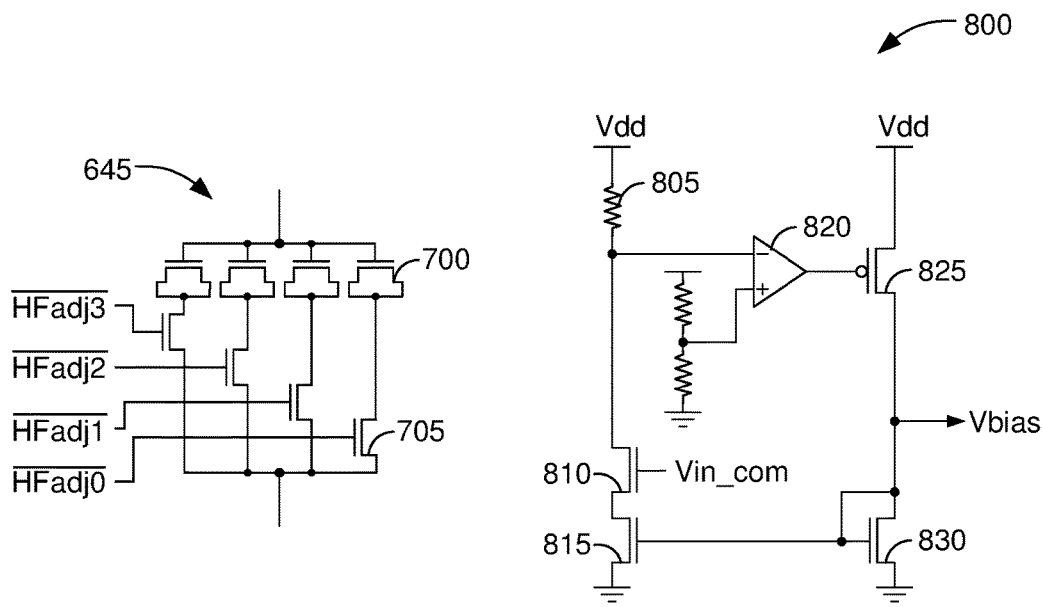
FIG. 7 details an embodiment of variable capacitor 645 of FIG. 6.
FIG. 8 schematically depicts a bias-voltage generator 800 for use with equalizer 120 of FIG. 6.

FIG. 7 details an embodiment of variable capacitor 645 of FIG. 6: capacitor 650 is identical. Capacitor 645 includes a number of capacitor-connected transistors 700 and respective select transistors 705 controlled by signal HFadj. The areas, and thus the capacitances, of transistors 700 can vary from one to the next (e.g., their areas can be binary coded) for added granularity, or can be thermometer coded to reduce adjustment glitches that might otherwise occur when switching between values. Increasing values of HFadj[3:0] represent decreasing amounts of capacitance in the degeneration network, and therefore decreasing high-frequency gain.

FIG. 8 schematically depicts a bias-voltage generator 800 for use with equalizer 120 of FIG. 6. A resistor 805 and transistors 810 and 815 form a half-circuit replica of equalizer stage 600, with the input common-mode voltage Vin_com applied to the gate of transistor 810. A feedback loop including an amplifier 820 and a pair of transistors 825 and 830 sets the voltage on the inverting (−) terminal of amplifier 820 equal to the voltage applied to the non-inverting (+) terminal. In an embodiment in which supply voltage Vdd is 1.2 volts, a resistor divider provides one-volt to the non-inverting terminal of amplifier 820. The resulting bias voltage Vbias to stages 600 and 605 then establishes a one-volt common-mode output voltage for those stages. In some embodiments, lower common-mode voltages are avoided to ensure that transistors 615 and 620 of FIG. 6 are always in saturation.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments.

A signal driving circuit is said to "output" a signal to a signal receiving circuit when the signal driving circuit asserts (or de-asserts, if explicitly stated or indicated by context) the signal on a signal line coupled between the signal driving and signal receiving circuits. The output (input) of a signal driving (receiving) circuit is generically referred to as an output (input) port. Circuit elements are controlled by application of control signals to respective control ports.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. For example, the depicted embodiments are signal-data-rate (SDR) systems, but other embodiments may support e.g. double-data-rate (DDR) or quad-data-rate (QDR) operation instead of or in addition to SDR operation. Furthermore, the receivers described above employ current-mode signaling, but might also be adapted to employ voltage-mode schemes in which signals are conveyed as modulated voltages. Voltage thresholds may also be employed in the latter case by simply converting current signals to voltage for comparison with a voltage reference. In addition, embodiments of the invention may be adapted for use with multi-pulse-amplitude-modulated (multi-PAM) signals, and PrDFE taps can be inserted after equalizer 120. Moreover, some components are shown directly connected to one another while others are shown connected via intermediate components. In each instance the method of interconnection, or "coupling," establishes some desired electrical communication between two or more circuit nodes, terminals, or ports. Such coupling may often be accomplished using a number of circuit configurations, as will be understood by those of skill in the art. Therefore, the spirit and scope of the appended claims should not be limited to the foregoing description. Where U.S. law applies, only those claims specifically reciting "means for" or "step for" should be construed in the manner required under the sixth paragraph of 35 U.S.C. § 112.

What is claimed is:

1. An integrated circuit comprising:
a continuous-time equalizer to receive a signal and to equalize the received signal to produce an equalized signal, wherein the signal exhibits inter-symbol interference (ISI) and the continuous-time equalizer exhibits a gain that is adjustable in response to a control signal;
a first sampler to periodically sample the equalized signal to produce data samples;
a second sampler to sample the equalized signal and thereby produce error samples; and
an adaptation engine to receive the data samples and the error samples, to measure post-cursor ISI of the signal using the data samples and the error samples, and to issue the control signal to the continuous-time equalizer responsive to the measure of the post-cursor ISI.

2. The integrated circuit of claim 1, wherein the equalizer equalizes the signal using at least one of frequency-selective amplification and frequency-selective attenuation.

3. The integrated circuit of claim 1, wherein the second sampler periodically samples the equalized signal.

4. The integrated circuit of claim 1, wherein the equalizer is adjustable in response to a second control signal, and wherein the adaptation engine issues the second control signal.

5. The integrated circuit of claim 4, wherein the gain includes a low-frequency gain and a high-frequency gain, and wherein the control signal adjusts the low-frequency gain and the second control signal adjusts the high-frequency gain.

6. The integrated circuit of claim 1, the adaption engine including storage elements to store historical ones of the data samples and logic to generate the control signal from the historical data samples and the error samples.

7. The integrated circuit of claim 6, wherein each of the storage elements stores one of the data samples of a corresponding latency, and wherein the adaptation engine simultaneously compares ones of the data samples of different latencies to the same one of the error samples.

8. The integrated circuit of claim 7, wherein the adaptation engine computes the control signal by combining comparisons of temporally adjacent data samples with the same one of the error samples.

9. The integrated circuit of claim 6, further comprising a decision-feedback equalizer to further equalize the equalized signal, the adaptation engine including tap-value generators to generate filter tap values responsive to the historical data samples and the error samples and apply the filter tap values to the decision-feedback equalizer.

10. The integrated circuit of claim 9, wherein each of the tap-value generators performs a sign-sign, least-mean-squared algorithm on pairs of the data samples and the error samples.

11. An integrated circuit comprising:
a continuous-time equalizer having an equalizer input port to receive an input signal, an equalizer control port, and an equalizer output port, the continuous-time equalizer to equalize the input signal to produce an equalized signal;
means for measuring first-post-cursor inter-symbol interference (ISI) exhibited by the equalized signal; and
means for adjusting the continuous-time equalizer based upon the measured first-post-cursor ISI.

12. The integrated circuit of claim 11, further comprising sampling means for obtaining error and data samples from the equalized signal.

13. The integrated circuit of claim 12, wherein the means for adjusting the continuous-time equalizer adjusts the continuous-time equalizer based upon the error and data samples.

14. The integrated circuit of claim 11, wherein the equalizer equalizes the input signal using at least one of frequency-selective amplification and frequency-selective attenuation.

15. The integrated circuit of claim 14, further comprising a data sampler to sample the equalized signal to produce data samples and an error sampler to sample at least one of the input signal and the equalized signal to produce error samples, wherein the means for measuring the first-post-cursor ISI compares that data samples with the error samples.

16. The integrated circuit of claim 15, wherein the equalizer exhibits a low-frequency gain and a high-frequency gain, and the means for adjusting the equalizer both the low-frequency gain and high-frequency gain responsive to the measured first-post-cursor ISI.

17. The integrated circuit of claim 11, further comprising a decision-feedback equalizer to further equalize the equalized signal, the means for adjusting the continuous-time equalizer further for adjusting the decision-feedback equalizer.

18. A non-transitory computer-readable medium having stored thereon a data structure defining a receiver adapted to receive signals conveyed over a communication channel, the receiver comprising:

a continuous-time equalizer having an equalizer input port coupled to the channel, an equalizer control port, and an equalizer output port, the continuous-time equalizer to equalize the signals to produce equalized signals on the equalizer output port;

a data sampler having a data-sampler input port, coupled to the equalizer output port, and a data-sampler output port, the data sampler to periodically sample the equalized signals and thereby produce data samples;

an error sampler having an error-sampler input port, coupled to the equalizer output port, and an error-sampler output port, the error sampler to periodically sample the equalized signals and thereby produce error samples; and an adaptation engine having a first adaptation-engine input port coupled to the data-sampler output port, a second adaptation-engine input port coupled to the error-sampler output port, and an adaptation-engine output port coupled to the equalizer control port, the adaptation engine to measure post-cursor ISI using the data samples and the error samples, and to issue a control signal to the equalizer control port responsive to the measure of the post-cursor ISI.

19. The non-transitory computer-readable medium of claim 18, the equalizer to exhibit a low-frequency gain and a high-frequency gain and the adaptation engine to adjust both the low-frequency gain and high-frequency gain.

20. The non-transitory computer-readable medium of claim 19, further comprising a decision-feedback equalizer to further equalize the equalized signals.

\* \* \* \* \*